(12) United States Patent
Goss et al.

(10) Patent No.: US 9,828,680 B2
(45) Date of Patent: Nov. 28, 2017

(54) METHOD FOR OPERATING A BEARING ARRANGEMENT

(71) Applicant: Schaeffler Technologies AG & Co. KG, Herzogenaurach (DE)

(72) Inventors: Matthias Goss, Adelsdorf (DE); Walter Holweger, Epfendorf (DE); Marcus Wolf, Herzogenaurach (DE); Toni Blass, Bergrheinfeld (DE); Holger Kaup, Erlangen (DE); Jorg Loos, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/912,688

(22) PCT Filed: Jul. 25, 2014

(86) PCT No.: PCT/DE2014/200352
§ 371 (c)(1),
(2) Date: Feb. 18, 2016

(87) PCT Pub. No.: WO2015/028010
PCT Pub. Date: Mar. 5, 2015

(65) Prior Publication Data
US 2016/0201202 A1    Jul. 14, 2016

(30) Foreign Application Priority Data

Aug. 27, 2013  (DE) .................. 10 2013 216 995

(51) Int. Cl.
| | | |
|---|---|---|
| *F16C 19/00* | (2006.01) | |
| *C23F 13/06* | (2006.01) | |
| *C23F 13/02* | (2006.01) | |
| *F16C 19/52* | (2006.01) | |

(52) U.S. Cl.
CPC .............. *C23F 13/06* (2013.01); *C23F 13/02* (2013.01); *F16C 19/52* (2013.01)

(58) Field of Classification Search
CPC .... F16C 19/52; F16C 41/002; F16C 2202/30; F16C 2300/40; C23F 13/02; C23F 13/06
See application file for complete search history.

(56) References Cited

U.S. PATENT DOCUMENTS

| | | | |
|---|---|---|---|
| 6,530,694 B2 * | 3/2003 | Takemura ............. | F16C 41/002 384/476 |
| 8,240,923 B2 * | 8/2012 | Galehouse ............. | F16C 33/64 384/499 |

(Continued)

FOREIGN PATENT DOCUMENTS

| | | |
|---|---|---|
| DE | 102007055575 | 6/2009 |
| DE | 102011017776 | 10/2012 |

(Continued)

*Primary Examiner* — James Pilkington
(74) *Attorney, Agent, or Firm* — Volpe and Koenig, P.C.

(57) ABSTRACT

A method for operating a bearing arrangement (1) including at least one rolling bearing (2). The method provides for applying a positive electric potential to a bearing part (3) of the rolling bearing (2), another part (4) of the bearing arrangement (1) being connected as a cathode, and a current flowing between the bearing part (3) and the cathode (4) is limited.

9 Claims, 2 Drawing Sheets

(56) References Cited

U.S. PATENT DOCUMENTS

2010/0316315 A1* 12/2010 Shimazu ................ F16C 33/44
 384/445
2011/0188794 A1   8/2011 Beresch et al.
2014/0044387 A1   2/2014 Kirchhoff et al.

FOREIGN PATENT DOCUMENTS

| FR | 1047000 | 12/1953 |
| GB | 1123595 | 8/1968 |
| GB | 1462931 | 1/1977 |
| WO | 9506761 | 3/1995 |
| WO | 2006053462 | 5/2006 |
| WO | 2009135482 | 11/2009 |
| WO | 2010102646 | 9/2010 |

* cited by examiner

METHOD FOR OPERATING A BEARING ARRANGEMENT

FIELD OF THE INVENTION

The invention relates to a method for operating a bearing arrangement comprising at least one roller bearing, wherein an electrical voltage is applied to at least one bearing part of the roller bearing, in particular, to a bearing ring.

BACKGROUND

From DE 10 2011 017 776 A1, a bearing with a corrosion-protected bearing part is known, wherein the corrosion protection is achieved with the help of an external power source. Here, a bearing part, namely a bearing ring of a roller bearing, is connected as a cathode of the external power supply. The associated anode is arranged opposite the bearing ring and can be constructed as a ring anode.

SUMMARY

The invention is based on the objective of refining a corrosion protection device operating with a power source for a roller bearing relative to the cited prior art.

This objective is achieved according to the invention by a method for operating a bearing arrangement comprising at least one roller bearing. The objective is likewise achieved by a bearing arrangement that comprises a power supply and control unit formed for carrying out the method.

According to the method of the invention, a positive electrical potential is applied to a bearing part of the roller bearing to be protected, while another part of the bearing arrangement is connected as a cathode. The current flowing between the bearing part and the cathode is limited. The limit can be realized in a simple way, for example, by connecting an electrical resistance in advance in series that is significantly larger than the electrical resistance of the roller bearing. Another possibility of limiting the current flowing through the bearing part is to regulate the current. The maximum current density is, in each case, preferably at most $0.13\ A/mm^2$ with respect to the area of Hertzian contact stress.

The invention starts from the idea that various corrosion mechanisms can lead to damage to the roller bearings. A proven method for preventing corrosion on metallic machine parts is cathode corrosion protection. Here, a part to be protected from corrosion, in the case of the cited DE 10 2011 017 776 A1, a roller bearing ring, is connected as a cathode. The associated anode is generally also designated as a sacrificial anode and has only one function within the corrosion protection device, but absolutely no mechanical function.

Turning away from conventional cathode corrosion protection systems, according to the invention a positive electrical potential is applied to a mechanically loaded roller bearing part and thus the roller bearing part is connected as an anode. Surprisingly, this is an effective measure against white etching cracks (WEC) and also white etching areas (WEA). For background on WEC and WEA in roller bearings, refer to DE 10 2007 055 575 A1. According to that document, the risk of WEC in roller bearing parts should be countered by the targeted generation of internal compressive stresses in a raceway element of a roller bearing.

The approach followed by the invention, namely the connection of a mechanical functional part as an anode of a corrosion protection device, might appear counterproductive in consideration of past experience, because material abrasion on the mechanically loaded roller bearing part, in particular, the bearing ring, is theoretically promoted by its connection to a positive electrical potential. Under real conditions of use of a roller bearing with oil or grease lubrication, however, this effect is negligible. The damage mechanism known as WEC is significantly more relevant. This mechanism is also interpreted as corrosion roller fatigue in the cited document DE 10 2007 055 575 A1. According to common theories, hydrogen plays a role in the WEC damage mechanism. The electrical potential according to the invention in the roller bearing part to be protected ensures that protons are kept away from areas of the roller bearing part at risk of WEC. This positive effect, which effectively counteracts WEC damage, by far outweighs any theoretically conceivable negative effects related to surface corrosion due to the connection of the roller bearing part as an anode.

Another effect that is significant for the effectiveness of the method according to the invention is oxidation that is caused by the potential applied to the protected bearing part. Metal oxides are produced by this oxidation, like those also formed in a chemical black process. In contrast to a chemical black process, the oxides that are formed and are abraded again from the workpiece surface during operation of the roller bearing are instead permanent. Different than a chemical black process, which has, due to the wear, only a limited time protective effect, the connection of the bearing part to be protected as an anode provides permanent protection.

To rule out any damage due to electrical currents flowing through bearing components, namely bearing rings and roller bodies, the current flowing through the protected roller bearing part is limited, in particular regulated, to a sufficiently low value. A current intensity set with respect to regulation or limited in a simpler electronic way can be, depending on the bearing type, for example, in a range between 200 microamperes and 300 microamperes or in a range between 20 microamperes and a maximum of 25 microamperes.

Independent of the bearing size, the current flowing through the bearing part to be protected is advantageously set, in particular, regulated, such that it is in an interval in which a voltage-current characteristic curve has a local voltage maximum as a maximum value within the entire interval. Here, the knowledge is used that, in the range of very low currents flowing through the roller bearing, a current increase initially corresponds to a relative strong voltage increase. Here, an approximately linear relationship can be given until a local voltage maximum is achieved. In the range of this local maximum in which the roller bearing is operated in a preferred process, current breakdowns occur that are more common at higher current intensities. Due to the accumulation of current breakdowns, the applied voltage decreases in a limited range for increasing current intensities. The current intensity at which the bearing arrangement is operated is preferably at least 20% and at most 400% of the current intensity where the local voltage maximum lies.

As a cathode of the corrosion protection system according to the invention, an electrically conductive part can be used that is either not loaded mechanically or is a mechanically loaded roller bearing part, in particular, a bearing ring. In the latter case, the bearing part connected as a cathode can be either a component of the same roller bearing that also has the bearing part connected as an anode or it can be a component of another roller bearing. In both cases, as the cathode, preferably a part is used that is made from a different material, namely a material that is less at risk of WEC, than the roller bearing part that is connected as an anode and is at risk of corrosion, in particular, WEC.

According to one alternative construction, multiple bearing rings of the same roller bearing are applied to the same positive potential, wherein they function together as an anode within the corrosion protection system. According to the associated cathode, the associated cathode is preferably not a roller bearing part.

The roller bearing part protected with the method according to the invention can be part of a rotating bearing or part of a linear bearing. Likewise, combinations of rotating and linear bearings are suitable for the application of the method. The method can be used, for example, in the areas of wind power, steel industry, paper industry, automobile manufacturing, textile industry, and household appliances. In particular, the components to be protected from corrosion in roller bearings are, for example, components of transmission bearings or generator bearings.

An embodiment of the invention is explained in more detail below with reference to a drawing. Shown herein are:

DETAILED DESCRIPTION OF THE PREFERRED EMBODIMENTS

Figure 1:
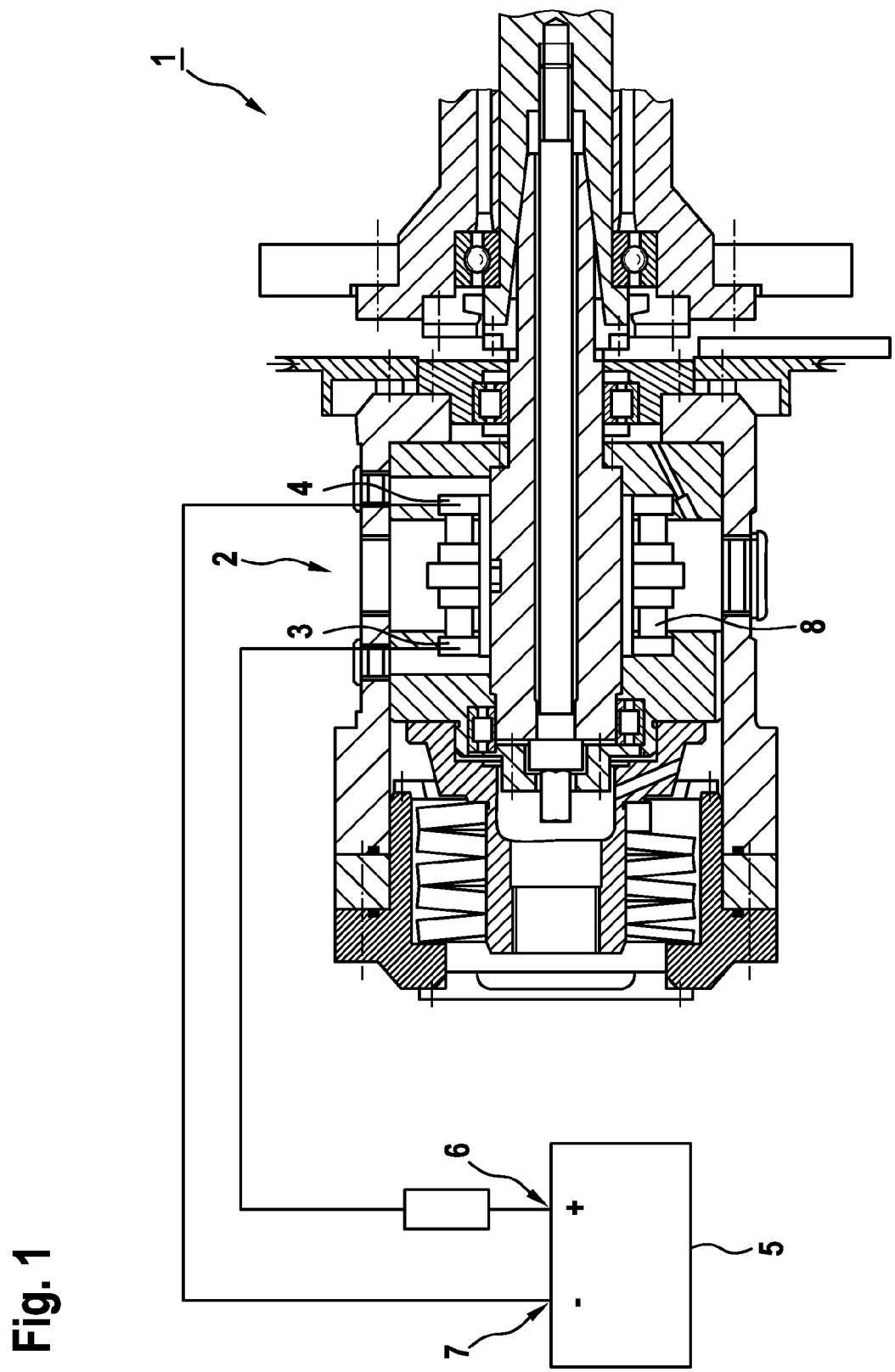
FIG. 1 in a simplified sectional view, a bearing arrangement with electrical corrosion protection system.

The bearing arrangement shown in FIG. 1 and marked overall with the reference symbol 1 is a roller bearing test bed FE8 according to DIN 51819 that was originally designed for testing lubricants. The functionality of the corrosion protection system according to the invention was verified with tests carried out on this test bed. In commercial use of the corrosion protection system, the bearing arrangement 1 can be, for example, a main shaft bearing, a transmission bearing, or a generator bearing of a wind turbine.

In the present case, a roller bearing 2 of the bearing arrangement 1 is formed as an axial bearing arrangement. The roller bearing 2 has two bearing parts 3, 4, namely bearing disks of which the bearing disk 3 is connected as an anode and the bearing disk 4 is connected as a cathode of the corrosion protection system. The central electronic component of the corrosion protection system is a power supply and control unit 5 that has connections 6, 7 to which the bearing disk 3 connected as an anode or the bearing disk 4 connected as a cathode are connected. While the bearing disk 4 of the roller bearing 2 is connected to ground, the bearing disk 3 is connected to a positive electrical potential of approximately 5 volts. The exact magnitude of the positive electrical potential, however, is not decisive for the corrosion protection method.

The current that flows between the bearing parts 3, 4 acting as electrodes and is regulated by the power supply and control unit 5 to an at least approximately constant value, however, is of central importance. In the arrangement according to FIG. 1, this value is between 200 microamperes and 250 microamperes and is thus both large enough that it prevents damage due to corrosion, in particular, WEC damage, on the bearing disk 3, and is also low enough to reliably rule out damage caused by electrical currents on components of the roller bearing 2, also roller bodies 8.

With respect to the relationship between the current flowing through the bearing arrangement 1 and the voltage applied between the connections 6, 7, FIG. 2 will be referenced below.

Figure 2:
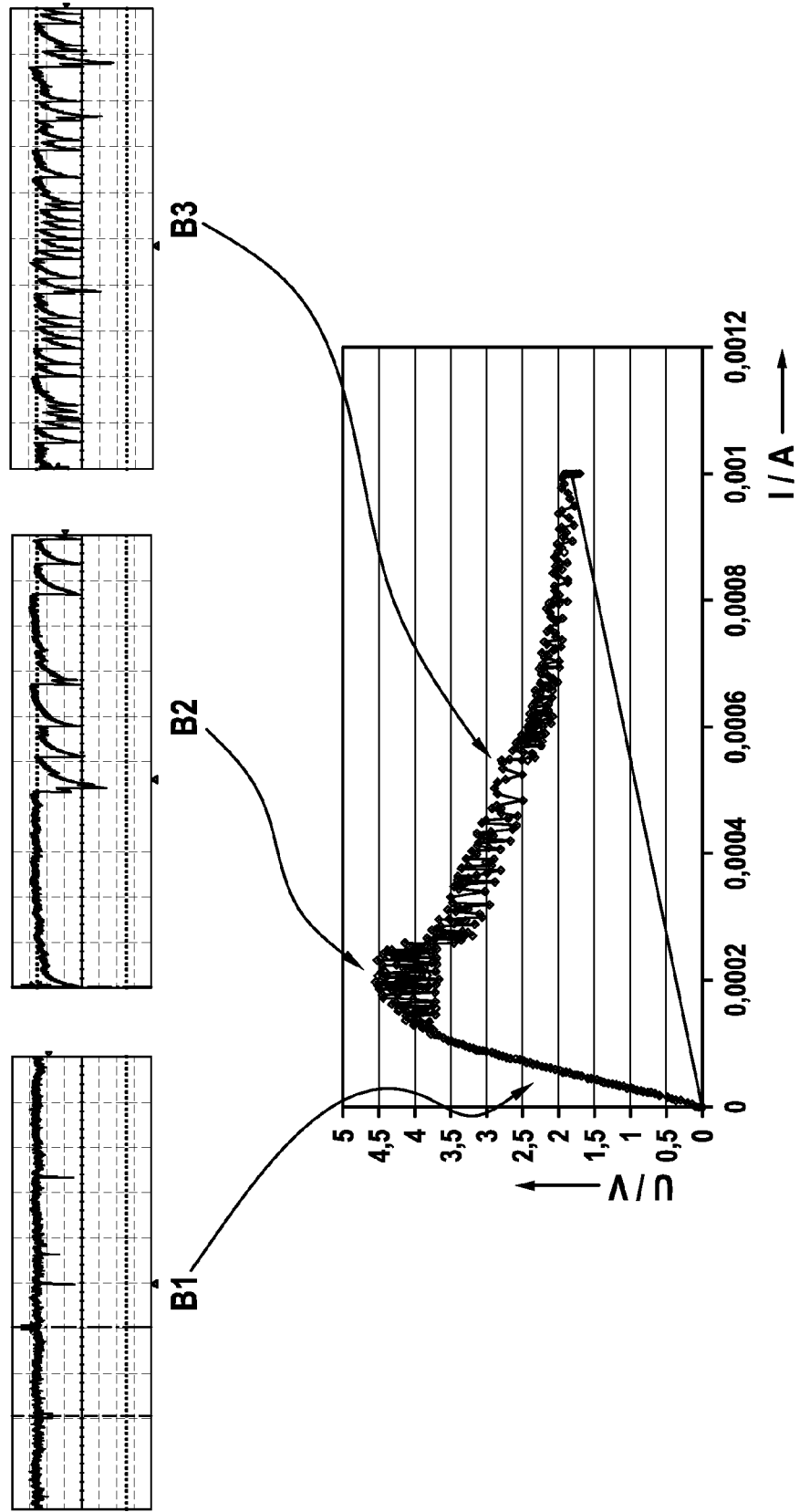
FIG. 2 in a diagram, the relationship between the electrical current flowing through the bearing arrangement according to FIG. 1 and the applied voltage.

The diagram in FIG. 2 shows a voltage-current characteristic curve on which three operating points B1, B2, B3 are marked, wherein for each operating point B1, B2, B3, the exact voltage curve measured with an oscilloscope is shown as an example in separate, small diagrams. The voltage U (in volts) plotted in the characteristic curve as a function of current I (in amperes) is to be understood as an effective value.

The operating point B1 is in a region of the characteristic curve in which an approximately linear relationship between the increase of current I and the increase of the effective voltage U can be observed. In time profile, the voltage has no strong fluctuations.

The second operating point B2 corresponds to a local maximum of the voltage-current characteristic curve. The associated time-resolved voltage curve shows that occasional voltage dips occur at this operating point B2. Each voltage dip corresponds to a current breakdown, wherein the voltage is then reestablished. Finally, at the operating point B3, continuous voltage dips occur, which means a lower effective voltage in comparison to the operating point B2 for a simultaneously higher current flow.

The bearing arrangement 1 is preferably operated at the second operating point B2 at which the current intensity I equals approximately 200 µA. Deviating from this, current intensities are also suitable that are below or above this value as long as the voltage U is reduced by no more than 50% relative to the value present at the local maximum, that is, at the operating point B2. In particular, this condition is fulfilled at the operating points B1 and B3.

The bearing part 4 connected as a cathode, that is, the bearing disk 4 connected to the negative connection 7 of the power supply and control unit 5, is made from a material that differs from the material of the bearing part 3 protected from corrosion by the power supply and control unit 5. Deviating from the arrangement according to FIG. 1, the bearing part 4 connected as a cathode and also could also be a mechanically unloaded or only slightly loaded part, for example, housing part, of the bearing arrangement 1. Another method variant provides that both bearing parts 3, 4 of the roller bearing 2 are set together to the same positive electrical potential, while another part, in particular, housing part, of the bearing arrangement 1 is connected to the connection 7, that is, to ground.

Independent of the field of application of the bearing arrangement 1, the roller bearing 2 is lubricated either with oil or with grease, in each case, with an electrically non-conductive or only minimally conductive material. In one especially preferred process, changes to the lubrication relationships by the power supply and control unit 5 are detected based on a changed electrical resistance between the bearing parts 3, 4.

LIST OF REFERENCE NUMBERS

1 Bearing arrangement
2 Roller bearing
3 Bearing part
4 Bearing part
5 Power supply and control unit
6 Connection
7 Connection
8 Roller body B1, B2, B3 Operating points
I Current intensity
U Voltage

The invention claimed is:
1. A method for operating a bearing arrangement comprising at least one roller bearing, the method comprising:
   applying a positive electrical potential to a bearing part of the roller bearing,
   connecting an additional bearing part of the bearing arrangement as a cathode, and
   limiting a current flowing between the bearing part and the cathode, wherein the bearing part and the additional bearing part each support roller bodies.
2. The method according to claim 1, wherein the current flowing through the bearing part is limited to a maximum density of 0.13 A/mm$^2$.
3. The method according to claim 1, further comprising regulating the current flowing through the bearing part to a value that is in an interval in which a voltage-current characteristic curve has a local voltage maximum as a maximum value within an entire interval.
4. The method according to claim 1, wherein the additional bearing part is a roller bearing ring that is made from a different material than the bearing part to which the positive potential is applied.
5. The method according to claim 1, wherein a same positive electrical potential is applied to multiple bearing parts of the roller bearing.
6. The method according to claim 1, wherein the roller bearing is formed as a rotating bearing.
7. The method according to claim 1, wherein the roller bearing is lubricated with oil.
8. The method according to claim 1, wherein the roller bearing is lubricated with grease.
9. A bearing arrangement comprising a power supply and control unit that is configured to carry out the method according to claim 1.

* * * * *